(12) United States Patent
Tanaka (10) Patent No.: US 12,046,394 B2
(45) Date of Patent: *Jul. 23, 2024

(54) METHOD FOR MANUFACTURING TERMINAL-EQUIPPED ELECTRIC WIRE

(71) Applicant: YAZAKI CORPORATION, Tokyo (JP)

(72) Inventor: Kenzo Tanaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,112

(22) Filed: Oct. 17, 2022

(65) Prior Publication Data

US 2023/0121308 A1    Apr. 20, 2023

(30) Foreign Application Priority Data

Oct. 19, 2021   (JP) ................................. 2021-171076

(51) Int. Cl.
*H01B 13/22*   (2006.01)
*H01B 7/282*   (2006.01)
(Continued)

(52) U.S. Cl.
CPC ......... *H01B 13/228* (2013.01); *H01B 7/2825* (2013.01); *H01B 13/062* (2013.01); *H01B 13/165* (2013.01)

(58) Field of Classification Search
CPC . H01R 7/04; H01R 4/18; H01R 4/183; H01R 4/20; H01R 4/70; H01R 13/03; H01R 13/5216; H01R 13/52; H01R 43/005; H01R 43/048; H01R 43/05; C08F 220/68; H01B 1/02; H01B 4/18; H01B 5/12; H01B 7/282; H01B 7/285; H01B 7/2806;
(Continued)

(56) References Cited

U.S. PATENT DOCUMENTS 5,564,946 A * 10/1996 Kodama ................ H01R 4/185
439/275
8,266,798 B2 * 9/2012 Martauz .................. H01R 4/62
29/857
(Continued)

FOREIGN PATENT DOCUMENTS

JP    2019-129067 A    8/2019

*Primary Examiner* — William H. Mayo, III
(74) *Attorney, Agent, or Firm* — KENEALY VAIDYA LLP (57) ABSTRACT

A method for manufacturing a terminal-equipped electric wire includes a step of crimping a terminal to one end of an electric wire, a step of crimping another terminal to the other end of the electric wire, and a waterproofing step of providing a sealing member at the other end of the electric wire so as to fill gaps between conductive element wires of an element wire bundle. The waterproofing step includes, in this order, a step of applying a resin to the element wire bundle to block at least a part of an inner portion of a tubular insulating sheath, a step of waiting during curing of the resin or until the curing is completed, and a step of applying the moisture curable resin to the element wire bundle, blocking a remaining portion of the inner portion of the insulating sheath, and curing the resin.

2 Claims, 7 Drawing Sheets

(51) Int. Cl.
*H01B 13/06* (2006.01)
*H01B 13/16* (2006.01)

(58) Field of Classification Search
CPC ...... H01B 7/2825; H01B 7/28; H01B 13/003; H01B 13/0013; H01B 13/062; H01B 13/165; H01B 13/228
USPC ...... 174/74 R, 78, 84 R, 84 C, 88 R; 439/86, 439/203, 274, 275, 519, 587, 589, 439/865–868, 877, 878, 886; 29/861, 29/857, 858, 855, 852
See application file for complete search history.

(56) References Cited

U.S. PATENT DOCUMENTS

| | | | |
|---|---|---|---|
| 9,721,700 B2* | 8/2017 | Kuriyagawa | H02G 1/14 |
| 9,954,289 B2* | 4/2018 | Miyakawa | H01R 4/70 |
| 11,961,634 B2* | 4/2024 | Tanaka | H01B 7/2806 |
| 2013/0072074 A1* | 3/2013 | Inoue | H01R 4/70 |
| | | | 439/886 |
| 2015/0017833 A1* | 1/2015 | Sato | H01R 13/52 |
| | | | 439/519 |
| 2015/0140202 A1* | 5/2015 | Sato | H01R 4/185 |
| | | | 427/58 |
| 2015/0140874 A1* | 5/2015 | Sakaguchi | H01R 4/62 |
| | | | 439/879 |
| 2015/0287496 A1* | 10/2015 | Sato | H01R 4/70 |
| | | | 29/867 |
| 2016/0308301 A1* | 10/2016 | Mano | C08F 222/102 |
| 2019/0229437 A1 | 7/2019 | Onuma | |

* cited by examiner

METHOD FOR MANUFACTURING TERMINAL-EQUIPPED ELECTRIC WIRE

CROSS-REFERENCE TO RELATED APPLICATIONS

This application is based on and claims priority under 35 USC 119 from Japanese Patent Application No. 2021-171076 filed on Oct. 19, 2021, the contents of which are incorporated herein by reference.

TECHNICAL FIELD

The present disclosure relates to a method for manufacturing a terminal-equipped electric wire in which terminals are crimped to both ends of an electric wire.

BACKGROUND ART

In related art, a terminal-equipped electric wire used for communication, power supply, and the like between devices mounted on a vehicle or the like has been proposed. In general, this type of terminal-equipped electric wire has a structure in which terminals are crimped to both ends of an electric wire, and is used for accommodating the both terminals in corresponding terminal accommodating chambers of connector housings. Further, each connector is connected to a counterpart connector of a corresponding device or the like. Further, for example, in one of terminal-equipped electric wires in related art, an element wire bundle exposed from an end of the electric wire is covered with an anticorrosion member in order to prevent corrosion of a crimped portion between the electric wire and the terminal or the like (for example, see JP2019-129067A).

Meanwhile, in the terminal-equipped electric wire that is routed at a place that may be exposed to water, such as an engine room of the vehicle, generally, a seal member (for example, a rubber plug) is crimped to an end portion of the electric wire together with the terminal, and a gap between the terminal accommodating chamber of the connector housing and the electric wire is sealed by the seal member. A connector having such a waterproof structure is also referred to as a waterproof connector since the water can be prevented from entering the terminal accommodating chamber from an outside of the connector. On the other hand, in general, the seal member is not provided in the terminal-equipped electric wire that is routed in a place where possibility of being exposed to the water is relatively low, such as in an interior of the vehicle. Such connector is also referred to as a non-waterproof connector.

The waterproof connector is fitted to the counterpart connector in, for example, an electric junction box provided in the engine room of the vehicle. Here, if sealing performance of the electrical junction box itself is improved from the viewpoint of waterproofing or the like, air pressure in the electric junction box may be lower than air pressure in the vehicle interior (that is, negative pressure may be generated) due to a rapid decrease in a temperature of air in the electric junction box when an engine that is being driven is stopped or the like. In this case, water such as moisture may be drawn from the end portion of the electric wire on a non-waterproof connector side routed in the vehicle interior toward the end portion of the electric wire on a waterproof connector side routed in the engine room through slight gaps between conductive element wires in the electric wire. In such a water absorption phenomenon, since the water reaches the terminal on the waterproof connector side through the electric wire, it is difficult to stop the water with the above-described seal member.

SUMMARY OF INVENTION

An object of the present disclosure is to provide a method for manufacturing a terminal-equipped electric wire capable of preventing water from entering into gaps between conductive element wires of an electric wire.

In order to achieve the above object, a method for manufacturing a terminal-equipped electric wire according to the present disclosure is characterized as follows.

Aspect of non-limiting embodiments of the present disclosure relates to a method for manufacturing a terminal-equipped electric wire including an electric wire having an element wire bundle in which a plurality of conductive element wires are bundled and a tubular insulating sheath covering the element wire bundle, a first terminal crimped to one end of the electric wire, and a second terminal crimped to the other end of the electric wire, the method including:

a step of crimping the first terminal to the one end of the electric wire so as to electrically connect the element wire bundle exposed from the one end of the electric wire and the first terminal;

a step of crimping the second terminal to the other end of the electric wire such that an element wire crimping portion of the second terminal is crimped to the element wire bundle exposed from the other end of the electric wire, and a sheath crimping portion of the second terminal is crimped to a tubular seal member attached to an outer periphery of the other end of the electric wire;

a first waterproofing step of providing, at the one end of the electric wire to which the first terminal is crimped, an anticorrosion member that covers the element wire bundle so as to isolate the element wire bundle from outside air; and a second waterproofing step of providing, at the other end of the electric wire to which the second terminal is crimped, a sealing member so as to fill gaps between the conductive element wires in the tubular insulating sheath and seal an inside of the tubular insulating sheath, in which the second waterproofing step includes, in this order,
a step of applying a moisture curable resin to the element wire bundle which is exposed to an outside and is located between the element wire crimping portion and the sheath crimping portion, and causing the moisture curable resin to penetrate gaps between the conductive element wires so as to block at least a part of an inner portion of the tubular insulating sheath, a step of waiting during curing of the moisture curable resin penetrated into the gaps between the conductive element wires so as to block the at least a part of the inner portion of the tubular insulating sheath or until the curing is completed, and a step of applying the moisture curable resin to the element wire bundle which is exposed to the outside and is located between the element wire crimping portion and the sheath crimping portion, and causing the moisture curable resin to penetrate the gaps between the conductive element wires and curing the moisture curable resin so as to block a remaining portion of the inner portion of the insulating sheath.

According to a method for manufacturing a terminal-equipped electric wire of the present invention, after terminals (that is, a first terminal and a second terminal) are crimped to both ends of an electric wire, in a first waterproofing step, at one end of the electric wire to which the non-waterproof first terminal not including a seal member is crimped, an anticorrosion member is provided to cover an element wire bundle exposed from an insulating sheath so as to isolate the element wire bundle from outside air. On the other hand, in a second waterproofing step, at the other end of the electric wire to which the waterproof second terminal including the seal member is crimped, the sealing member is provided so as to fill gaps between conductive element wires in the tubular insulating sheath and seal an inside of the tubular insulating sheath. Here, by applying and curing a moisture curable resin a plurality of times in the second waterproofing step, it is possible to appropriately provide the sealing member even in a case of an electric wire (thick electric wire) in which a diameter of an element wire bundle is large. In addition, since the gaps between the conductive element wires are sealed at the other end (that is, an electric wire end portion to which the waterproof second terminal is attached) of the electric wire, even if the other end of the electric wire is routed in a place where a temperature fluctuates greatly, such as an engine room, entering of water due to negative pressure described above can be prevented. Even if the sealing of the other end of the electric wire is incomplete, since the one end of the electric wire is covered with the anticorrosion member, an amount of water that is absorbed when the negative pressure is generated is limited to a very small amount of water that is originally presented in the tubular insulating sheath of the electric wire. Therefore, according to the manufacturing method of the present configuration, it is possible to manufacture the terminal-equipped electric wire capable of preventing the water from entering into the gaps between the element wires of the electric wire.

The present invention has been briefly described above. Details of the present invention will be further clarified by reading through embodiments for carrying out the invention to be described below with reference to the accompanying drawings.

DESCRIPTION OF EMBODIMENTS

Embodiment

Figure 1:
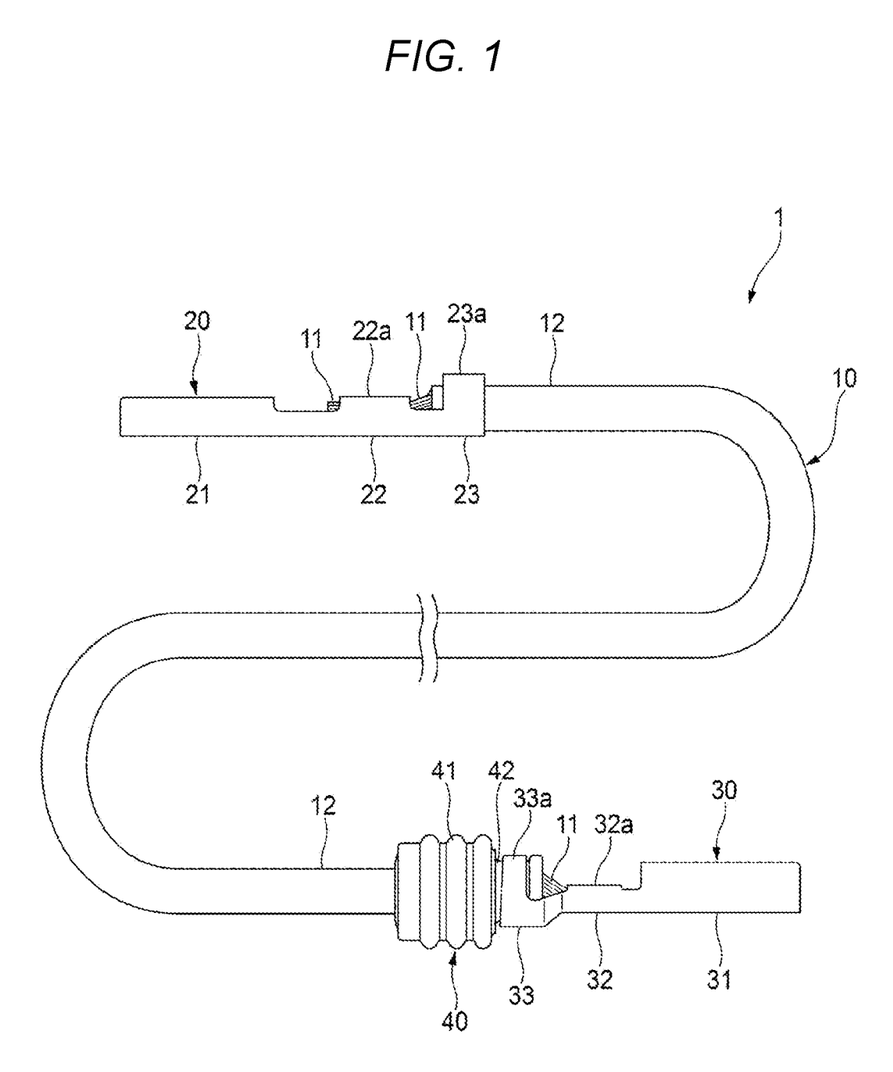
FIG. 1 is a side view of a terminal-equipped electric wire according to an embodiment of the present invention, showing a state before an anticorrosion member and a sealing member are provided in the terminal-equipped electric wire.

Hereinafter, a terminal-equipped electric wire 1 according to an embodiment of the present disclosure will be described with reference to the drawings. As shown in FIGS. 1 and 11, the terminal-equipped electric wire 1 includes an electric wire 10, a first terminal 20 crimped to one end of the electric wire 10, and a second terminal 30 crimped to the other end of the electric wire 10. As shown in FIG. 11, a waterproof seal member 40 is attached to an outer periphery of other end of the electric wire 10 to which the second terminal 30 is crimped, and such seal member is not provided at the one end of the electric wire 10 to which the first terminal 20 is crimped. An anticorrosion member 50 is provided at the one end of the electric wire 10 to which the first terminal 20 is crimped, and a sealing member 60 is provided at the other end of the electric wire 10 to which the second terminal 30 is crimped.

As shown in FIG. 11, the non-waterproof first terminal 20 not including a waterproof seal member is attached to a connector housing 70. Specifically, the connector housing 70 includes an accommodation hole (not shown) for inserting and accommodating the first terminal 20 crimped to the one end of the electric wire 10 and a terminal accommodating chamber (not shown) communicating with the accommodation hole. The first terminal 20 is inserted into the accommodation hole of the connector housing 70 and accommodated in the terminal accommodating chamber. A connector including the connector housing 70, the first terminal 20, and the like is typically fitted to a counterpart connector provided in a device (not shown) disposed in an interior of a vehicle having a relatively low possibility of being exposed to water.

On the other hand, the waterproof second terminal 30 having the waterproof seal member 40 is attached to a connector housing 80. Specifically, the connector housing 80 includes an accommodation hole (not shown) for receiving and accommodating the second terminal 30 crimped to the other end of the electric wire 10 and a terminal accommodating chamber (not shown) communicating with the accommodation hole. The second terminal 30 is inserted into the accommodation hole of the connector housing 80 and accommodated in the terminal accommodating chamber. When the second terminal 30 is accommodated in the terminal accommodating chamber, an inner wall surface of the accommodation hole and the seal member 40 are in close contact with each other, whereby the water is prevented from entering into the terminal accommodating chamber from an accommodation hole (fitting rear side). A connector including the connector housing 80, the second terminal 30, and the like is typically fitted to a counterpart connector provided in an electric junction box (not shown) disposed in an engine room 90 of the vehicle having a possibility of being exposed to the water. A gap between the connector housing 80 and a housing (not shown) of the counterpart connector to be fitted is sealed with a packing or the like, and the water is also prevented from entering into the terminal accommodating chamber from a fitting counterpart (fitting front side).

In a state where the second terminal 30 is accommodated in the terminal accommodating chamber of the connector housing 80, the seal member 40 seals a gap between the terminal accommodating chamber and the electric wire 10, whereby the water can be prevented from entering an inside of the terminal accommodating chamber from an outside. That is, the second terminal 30, the seal member 40, and the connector housing 80 constitute the connector having a water proof structure, and the connector is also referred to as a waterproof connector. On the other hand, the first terminal 20 and the connector housing 70 constitute the connector not having the water proof structure, and the connector is also referred to as a non-waterproof connector. The terminal-equipped electric wire 1, the connector housing 70, and the connector housing 80 constitute a wire harness 2 (see FIG. 11) routed in the vehicle.

Hereinafter, the electric wire 10, the first terminal 20, the second terminal 30, and the seal member 40 constituting the terminal-equipped electric wire 1 will be described in order. First, the electric wire 10 will be described. As shown in FIGS. 1, 9, 10, and the like, the electric wire 10 includes an element wire bundle 11 in which a plurality of conductive element wires 11a (see FIG. 10) are bundled, and a tubular insulating sheath 12 that covers the element wire bundle 11. The conductive element wires 11a are made of, for example, metal material containing aluminum. Each of the both end portions of the electric wire 10 is subjected to an end treatment of removing a part of the insulating sheath 12 to expose the element wire bundle 11. Hereinafter, for convenience of a description, in an extending direction of the electric wire 10, a side from a center of the electric wire 10 toward an end of the electric wire 10 is referred to as a "distal side", and a side from the end of the electric wire 10 toward the center of the electric wire 10 is referred to as a "proximal side".

Figure 2:
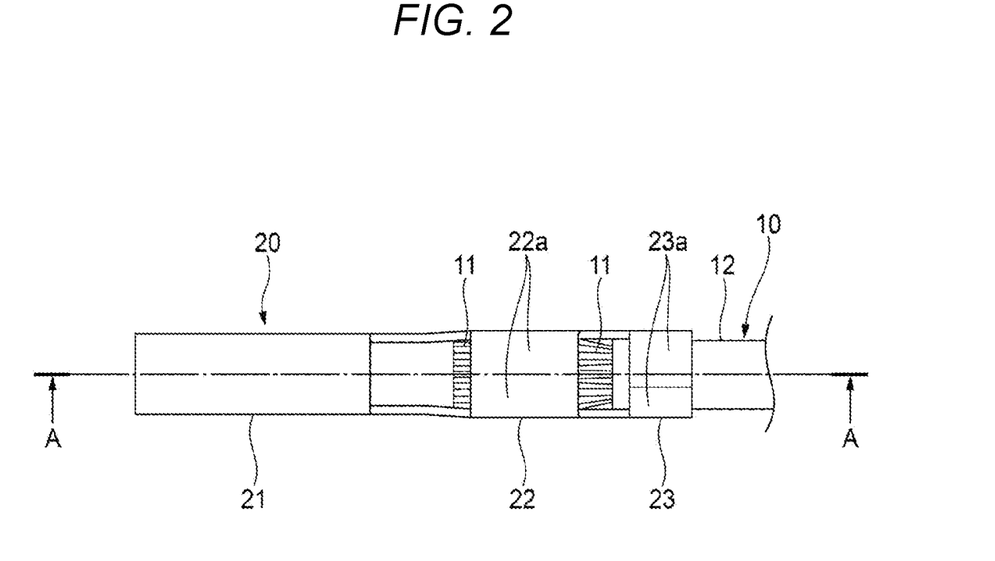
FIG. 2 is a top view of a non-waterproof first terminal crimped to one end of the terminal-equipped electric wire shown in FIG. 1.
Figure 4:
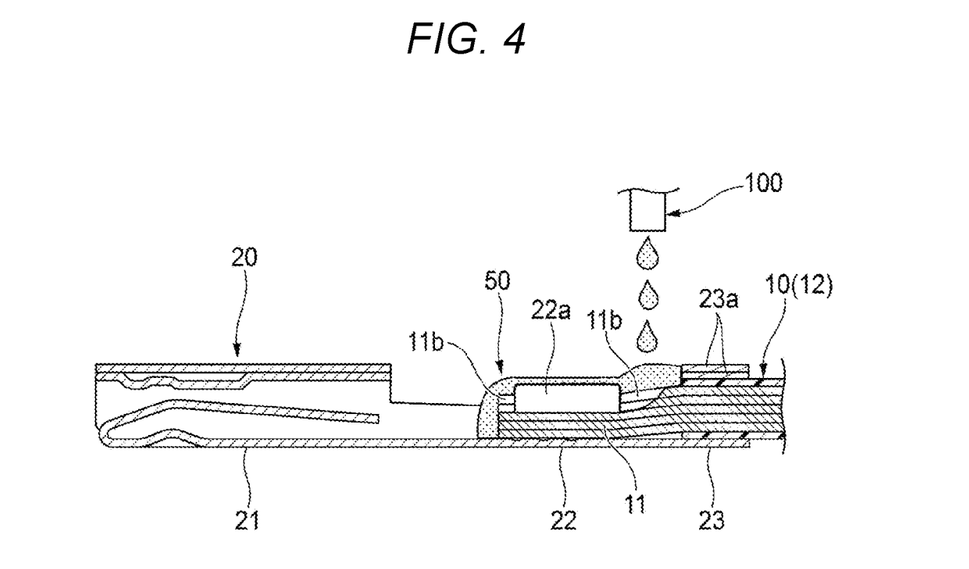
FIG. 4 is a cross sectional view taken along a line A-A in FIG. 2 and illustrating a step of providing the anticorrosion member at the one end of the electric wire to which the first terminal shown in FIG. 2 is crimped.

Next, the first terminal 20 will be described. The first terminal 20 is formed by performing pressing, bending, or the like on one metal plate made of copper or a copper alloy. As shown in FIGS. 1, 2, and 4, the first terminal (female terminal) 20 includes a connection portion 21, an element wire crimping portion 22 located on the proximal side of the connection portion 21 and spaced apart from the connection portion 21, and a sheath crimping portion 23 located on the proximal side of the element wire crimping portion 22 and spaced apart from the element wire crimping portion 22.

The connection portion 21 has a rectangular box shape, and has functions to insert and connect a counterpart terminal (male terminal). The element wire crimping portion 22 includes a pair of crimping pieces 22a extending upward from both sides of a bottom portion, and has a function to crimp the element wire bundle 11 exposed on one end side of the electric wire 10. The sheath crimping portion 23 includes a pair of crimping pieces 23a extending upward from both sides of a bottom portion thereof, and has a function to crimp an end portion on one end side of the insulating sheath 12 of the electric wire 10.

Figure 3:
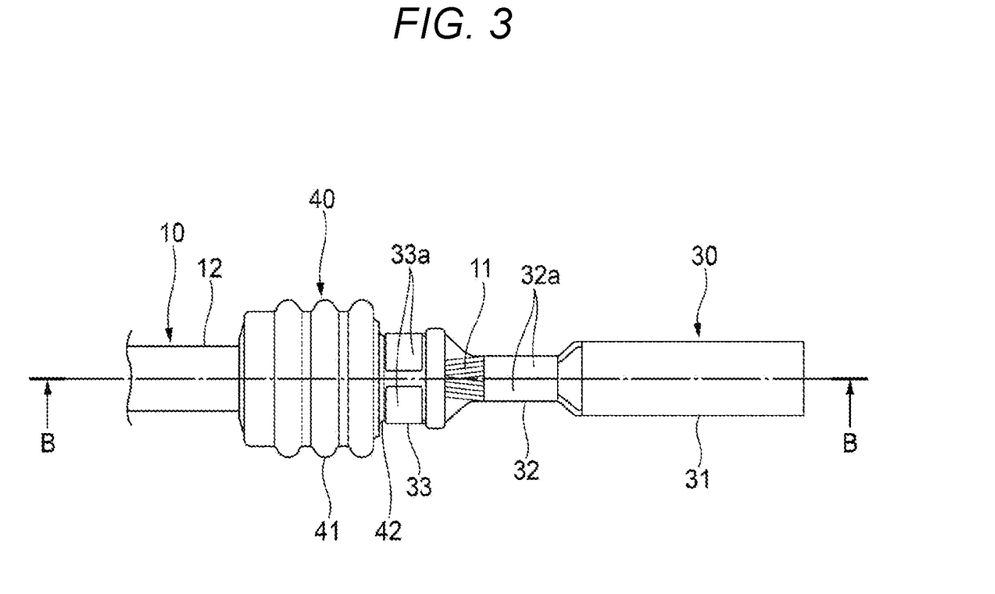
FIG. 3 is a top view of a waterproof second terminal crimped to the other end of the terminal-equipped electric wire shown in FIG. 1.
Figure 5:
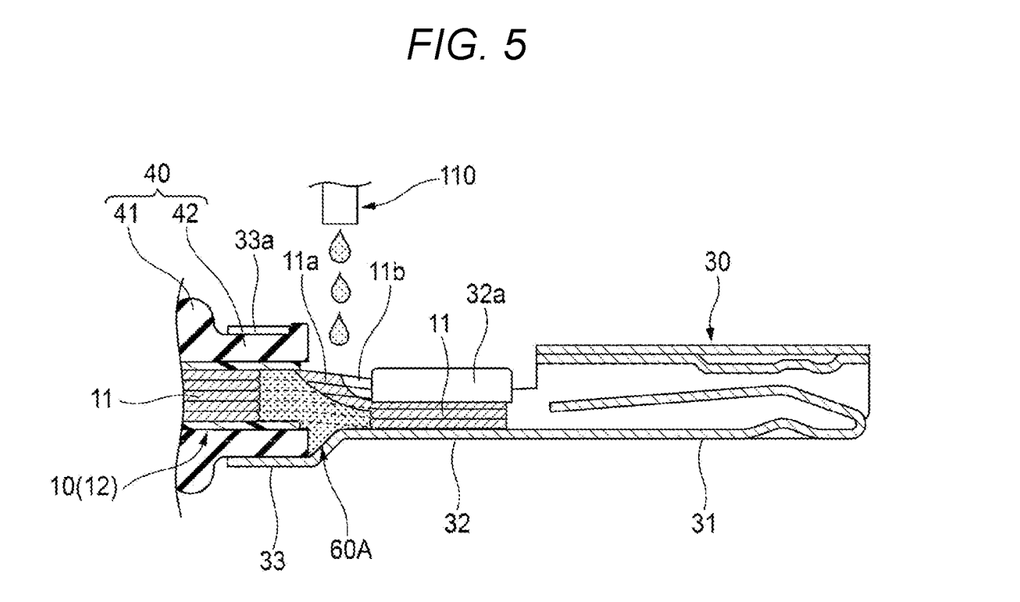
FIG. 5 is a cross sectional view taken along a line B-B in FIG. 3 and illustrating a first stage of a step of providing the sealing member to the other end of the electric wire to which the second terminal shown in FIG. 3 is crimped.

Next, the second terminal 30 will be described. The second terminal 30 is formed by performing pressing, bending, or the like on one metal plate made of copper or a copper alloy. As shown in FIGS. 1, 3, and 5, the second terminal (female terminal) 30 includes a connection portion 31, an element wire crimping portion 32 located on a proximal side of the connection portion 31 and spaced apart from the connection portion 31, and a sheath crimping portion 33 located on a proximal side of the element wire crimping portion 32 and spaced apart from the element wire crimping portion 32.

The connection portion 31 has a rectangular box shape, and has functions to insert and connect a counterpart terminal (male terminal). The element wire crimping portion 32 includes a pair of crimping pieces 32a extending upward from both sides of a bottom portion, and has a function to crimp the element wire bundle 11 exposed on the other end side of the electric wire 10. The sheath crimping portion 33 includes a pair of crimping pieces 33a extending upward from both sides of a bottom portion, and has a function to crimp an end portion (more specifically, a small diameter portion 42, which will be described later, of the seal member 40 disposed on an outer periphery of the end portion) on the other end side of the insulating sheath 12 of the electric wire 10.

Next, the seal member 40 will be described. The seal member 40 made of rubber includes a cylindrical large diameter portion 41 including a lip portion provided on an outer periphery thereof, and the cylindrical small diameter portion 42 having a diameter smaller than that of the large diameter portion 41. The seal member 40 is attached to the other end of the electric wire 10 in a state that the small diameter portion 42 is positioned on the distal side of the large diameter portion 41, such that the small diameter portion 42 is located on the outer periphery of the end portion on the other end side of the insulating sheath 12 of the electric wire 10. The members constituting the terminal-equipped electric wire 1 have been described above in order.

Next, a method for manufacturing the terminal-equipped electric wire 1 will be described. In order to manufacture the terminal-equipped electric wire 1, first, as shown in FIG. 1, the first terminal 20 is crimped to the one end of the electric wire 10, and the second terminal 30 is crimped to the other end of the electric wire 10 in a state where the seal member 40 is provided on the electric wire 10. An order of the crimping of the first terminal 20 and the crimping of the second terminal 30 is not limited.

As shown in FIGS. 2 and 4, the first terminal 20 is crimped to the one end of the electric wire 10 by crimping the pair of crimping pieces 22a and the pair of crimping pieces 23a using a predetermined jig in a state where the element wire bundle 11 exposed on the one end side of the electric wire 10 is placed on the element wire crimping portion 22 and the end portion on the one end side of the insulating sheath 12 of the electric wire 10 is placed on the sheath crimping portion 23. In a state where the first terminal 20 is crimped, a distal portion of the element wire bundle 11 protruding from the element wire crimping portion 22 toward the distal side and the element wire bundle 11 located between the element wire crimping portion 22 and the sheath crimping portion 23 are exposed to an outside (in contact with outside air) (see FIG. 2). The element wire crimping portion 22 after crimping has a B-crimp shape. That is, the element wire crimping portion 22 is crimped such that the pair of crimping pieces 22a bite into the element wire bundle 11 to push aside a part of the element wire bundle 11. Therefore, as shown in FIG. 4, a slight gap 11b is present in which the element wire bundle 11 is pushed aside on a distal side and a proximal side of the crimping piece 22a. However, FIG. 4 is merely a conceptual view illustrating a state in which the anticorrosion member 50 is provided in the first terminal 20, such a gap 11b is not necessarily required to be present, and the gap 11b does not substantially affect a waterproof effect of the anticorrosion member 50. The same applies to the gap 11b shown in FIGS. 5 and 6.

As shown in FIGS. 3 and 5, the second terminal 30 is crimped to the other end of the electric wire 10 by crimping the pair of crimping pieces 32a and the pair of crimping pieces 33a using the predetermined jig in a state where the element wire bundle 11 exposed on the other end side of the electric wire 10 is placed on the element wire crimping portion 32 and the small diameter portion 42 of the seal member 40 located at the end portion on the other end side of the insulating sheath 12 of the electric wire 10 is placed on the sheath crimping portion 33. In a state where the second terminal 30 is crimped, the element wire bundle 11 located between the element wire crimping portion 32 and the sheath crimping portion 33 is exposed to the outside (in contact with the outside air) (see FIG. 3).

Next, as shown in FIG. 4, the anticorrosion member 50 is provided at the one end of the electric wire 10 to which the first terminal 20 is crimped (first waterproofing step). The anticorrosion member 50 is provided at the one end of the electric wire 10 by applying, using a nozzle 100, an ultraviolet curable resin having fluidity to a surface of the element wire bundle 11 exposed to an outside on the one end side of the electric wire 10, and then irradiating the applied resin with ultraviolet rays to curing the resin. By providing the anticorrosion member 50 in this manner, an entire surface of the distal portion of the element wire bundle 11 and an entire surface of the element wire bundle 11 located between the element wire crimping portion 22 and the sheath crimping portion 23, which are exposed to the outside, are covered with the anticorrosion member 50 and isolated from the outside air (see FIG. 4).

Viscosity of the ultraviolet curable resin having the fluidity is preferably 20 mPa·s or more, and more preferably 20 mPa·s or more and 100 mPa·s or less at room temperature before curing. In this way, by using the ultraviolet curable resin having appropriately high viscosity, it is easy to configure the anticorrosion member 50 that appropriately covers a periphery of the element wire bundle 11 exposed from the insulating sheath 12 while preventing liquid dripping, excessive penetration, and the like. As the ultraviolet curable resin, an acrylic resin or an epoxy resin can be used.

A value of the viscosity described above can be measured, for example, in accordance with a viscosity test method defined in JIS standard K 7233. The room temperature is a test temperature determined in this type of viscosity test method, and is, for example, 25° C.

After the anticorrosion member 50 is provided at the one end of the electric wire 10 to which the first terminal 20 is crimped as described above, the sealing member 60 is provided at the other end of the electric wire 10 to which the second terminal 30 is crimped as shown in FIG. 5 (second waterproofing step). First, the sealing member 60 is provided at the other end of the electric wire 10 by first providing a first portion 60A, which is a part of the sealing member 60, as shown in FIG. 5, and then providing a second portion 60B, which is a remaining portion of the sealing member 60, as shown in FIG. 6.

As shown in FIG. 5, the first portion 60A of the sealing member 60 is provided at the other end of the electric wire 10 by applying, using a nozzle 110, a moisture curable resin having fluidity to the element wire bundle 11 exposed between the element wire crimping portion 32 and the sheath crimping portion 33 on the other end side of the electric wire 10, causing the moisture curable resin to penetrate into gaps between the conductive element wires 11a, and then waiting for a predetermined period in the outside air containing moisture to cure the resin.

Figure 7:
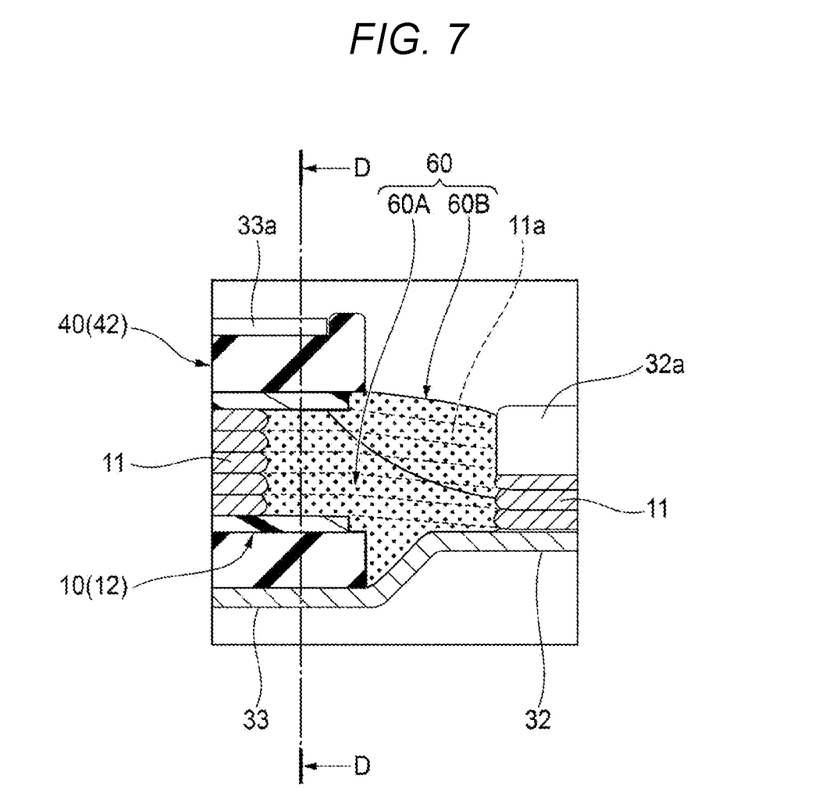
FIG. 7 is an enlarged view of a portion C in FIG. 6.
Figure 8:
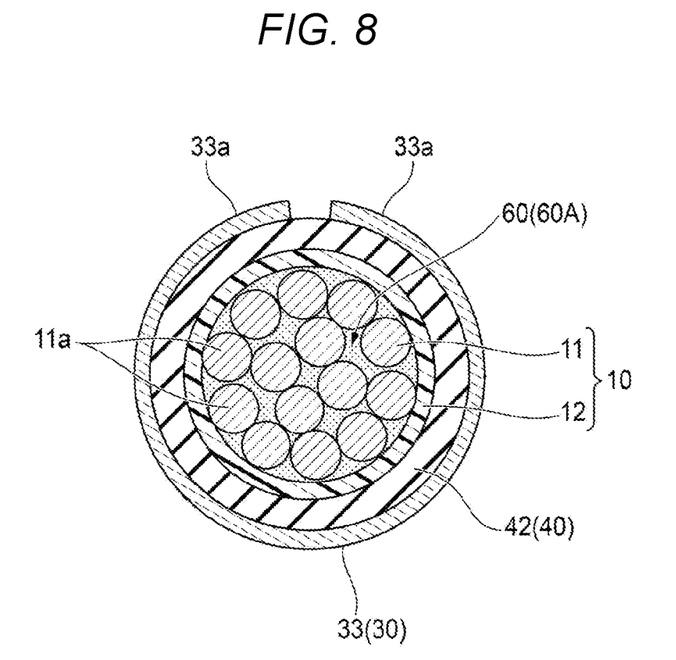
FIG. 8 is a cross sectional view taken along a line D-D in FIG. 7.

By providing the first portion 60A of the sealing member 60 in this manner, in the present example, as shown in FIGS. 5, 7, and 8, in addition to an entire region of the gaps between the conductive element wires 11a in the tubular insulating sheath 12 at the end portion on the other end side of the electric wire 10, a substantially lower half region of the gaps between the conductive element wires 11a in the element wire bundle 11 between the element wire crimping portion 32 and the sheath crimping portion 33 is continuously filled with the first portion 60A. At a place where the element wire crimping portion 32 is crimped to the element wire bundle 11, the gaps between the conductive element wires 11a are extremely narrow due to the crimping. Therefore, the moisture curable resin and a curing accelerator applied as described above are less likely to penetrate into an element wire crimping portion 32 side (that is, a distal side of the second terminal 30), and are likely to penetrate into a tube inner side (that is, a proximal side of the second terminal 30) of the insulating sheath 12. The same applies to a case where the second portion 60B of the sealing member 60 is provided as described later.

Figure 6:
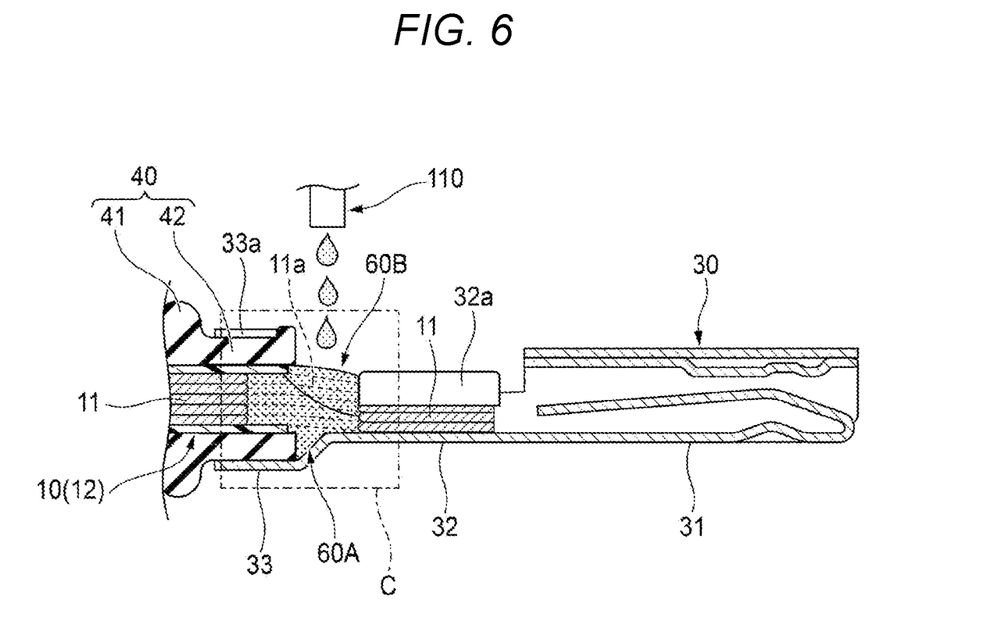
FIG. 6 is a cross sectional view taken along the line B-B in FIG. 3 and illustrating a second stage of the step of providing the sealing member to the other end of the electric wire to which the second terminal shown in FIG. 3 is crimped.

As described above, after the first portion 60A of the sealing member 60 is provided, as shown in FIG. 6, the second portion 60B of the sealing member 60 is provided so as to be laminated on the first portion 60A positioned between the element wire crimping portion 32 and the sheath crimping portion 33 by applying, using the nozzle 110, the moisture curable resin having the fluidity to the element wire bundle 11 exposed between the element wire crimping portion 32 and the sheath crimping portion 33 on the other end side of the electric wire 10, causing the moisture curable resin to penetrate into the gaps between the conductive element wires 11a, and then waiting for the predetermined period in the outside air containing the moisture to cure the resin. The moisture curable resin for the second portion 60B is preferably applied after completion of the curing of the first portion 60A, but may be applied in the middle of the curing of the first portion 60A.

By providing the second portion 60B of the sealing member 60 in this manner, in the present example, as shown in FIGS. 6 and 7, a substantially upper half region (that is, a remaining region other than the region filled with the first portion 60A) of the gaps between the conductive element wires 11a in the element wire bundle 11 between the element wire crimping portion 32 and the sheath crimping portion 33 is filled with the second portion 60B.

Accordingly, as shown in FIGS. 7 and 8, in addition to an entire region of the gaps between the conductive element wires 11a in the element wire bundle 11 between the element wire crimping portion 32 and the sheath crimping portion 33, an entire region of the gaps between the conductive element wires 11a in the tubular insulating sheath 12 at the end portion on the other end side of the electric wire 10 is continuously filled with the sealing member 60 (=the first portion 60A+the second portion 60B). As a result, an inside of the tubular insulating sheath 12 at the end portion on the other end side of the electric wire 10 is sealed.

In the present example, a reason why the application and the curing of the moisture curable resin are repeated twice (a plurality of times) is as follows. In order to completely seal the inside of the tubular insulating sheath 12 at the end portion on the other end side of the electric wire 10, it is necessary to seal the entire region of the gaps between the conductive element wires 11a in the tubular insulating sheath at the end portion on the other end side of the electric wire 10 with the sealing member 60. When the sealing member 60 is to be provided by applying and curing the moisture curable resin only once, an amount of the resin to be applied at one time is increased, and it is difficult to control a range in which the resin spreads. As a result, it is difficult to completely seal the inside of the tubular insulating sheath 12 at the end portion on the other end side of the electric wire 10. In a case of an electric wire (thick electric wire) in which a diameter of the element wire bundle is large, this tendency is particularly remarkable. In this regard, in the present example, the application and the curing of the moisture curable resin are repeated twice (a plurality of times). By repeating the application the plurality of times in this manner, the amount of the resin applied at one time is reduced, and thus the range of the resin spread by one application can be easily controlled. In the present example, by applying the resin to the entire region in the tubular insulating sheath 12 of the end portion on the other end side of the electric wire 10 in the first application, the inside of the tubular insulating sheath 12 of the end portion on the other end side of the electric wire 10 can be completely sealed only by the first portion 60A without waiting for a second application (see FIGS. 7 and 8).

As the moisture curable resin having the fluidity, for example, a resin containing cyanoacrylate as a main component (resin used for an instant adhesive) is used. Viscosity of the moisture curable resin having the fluidity is preferably 5 mPa·s or less, and more preferably 2 mPa·s or more and 5 mPa·s or less at room temperature before the curing. As described above, by using the moisture curable resin having appropriately low viscosity, the sealing member 60 can be formed that allows the resin to rapidly penetrate into the gaps between the conductive element wires 11a to appropriately fill the gaps in the tubular insulating sheath 12 of the end portion on the other end side of the electric wire 10. By using the resin containing cyanoacrylate as the main component as the moisture curable resin, a curing waiting time of the resin can be shortened, and productivity of the terminal-equipped electric wire 1 can be improved.

Furthermore, as described above, after the anticorrosion member 50 is provided on the one end of the electric wire 10, the sealing member 60 is provided on the other end of the electric wire 10, whereby even when the sealing member 60 is formed of the moisture curable resin having relatively low viscosity, the sealing member 60 is less likely to enter the inside of the tubular insulating sheath at the other end side of the electric wire 10 since entrance and exit of air is restricted by the anticorrosion member 50 at the one end of the electric wire 10. In other words, the sealing member 60 can be held between the conductive element wires 11a in the vicinity of the other end of the electric wire 10. Accordingly, impairment of flexibility of the electric wire 10 due to the sealing member 60 excessively entering the inside of the tubular insulating sheath 12 on the other end side of the electric wire 10 is prevented. As described above, after the anticorrosion member 50 is provided on the one end of the electric wire 10, the sealing member 60 is provided on the other end of the electric wire 10, whereby the terminal-equipped electric wire 1 shown in FIG. 9 is completed.

Figure 9:
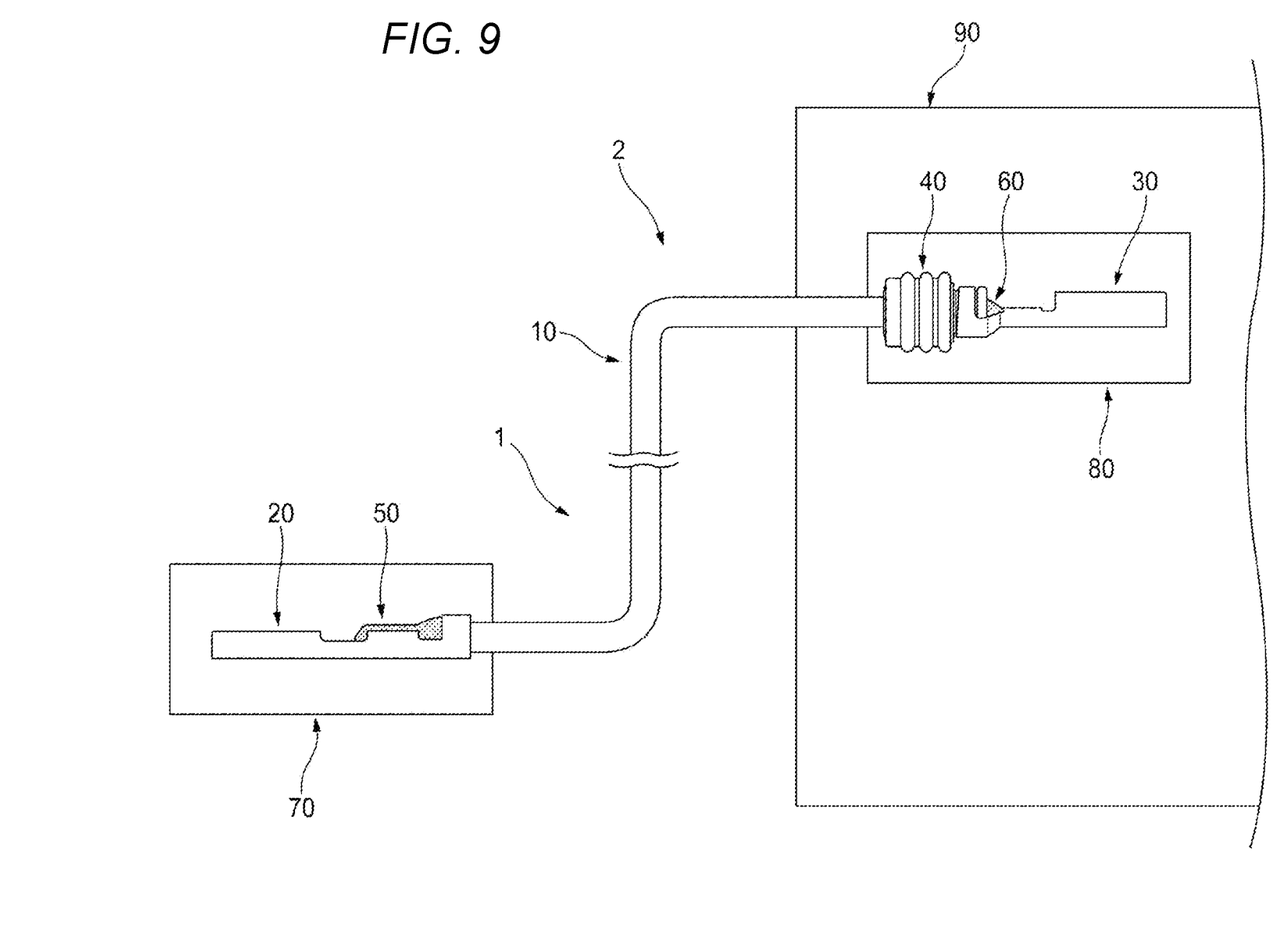
FIG. 9 is a conceptual view showing an example of a state in which the terminal-equipped electric wire according to the embodiment of the present invention is mounted on a vehicle and used.

In the completed terminal-equipped electric wire 1, as shown in FIG. 9, the first terminal 20 is accommodated in the terminal accommodating chamber of the connector housing 70, and the second terminal 30 is accommodated in the terminal accommodating chamber of the connector housing 80, thereby forming the wire harness 2. The connector housing 70 is fitted to the counterpart connector provided in the device disposed in the interior of the vehicle having the relatively low possibility of being exposed to the water, and the connector housing 80 is fitted to the counterpart connector provided in the electric junction box disposed in the engine room 90 of the vehicle having the possibility of being exposed to the water. Accordingly, routing of the wire harness 2 to the vehicle is completed.

Hereinafter, from the viewpoint of waterproofing, it is assumed that the electric junction box itself to which the connector housing 80 is connected has high sealing performance. In this case, air pressure in the electric junction box may become lower than air pressure in the vehicle interior (that is, negative pressure may be generated) due to a rapid decrease in a temperature of air in the electric junction box when an engine that is being driven is stopped or the like. In the terminal-equipped electric wire 1, the gaps between the conductive element wires 11a are sealed by the sealing member 60 at the other end (that is, the end portion at which the second terminal 30 is provided) of the electric wire 10, and the element wire bundle 11 is covered with the anticorrosion member 50 at the one end (that is, the end portion at which the first terminal 20 is provided) of the electric wire, and thus the water such as moisture is prevented from being drawn from the one end of the electric wire 10 on a non-waterproof connector side provided with the first terminal 20 toward a waterproof connector side provided with the second terminal 30 through the gaps between the conductive element wires 11a in the electric wire 10. In this way, it is possible to prevent the entering of the water through the tubular insulating sheath 12 of the electric wire 10 due to the negative pressure caused by the temperature fluctuation described above.

Operation and Effect

As described above, according to the method for manufacturing the terminal-equipped electric wire 1 according to the present embodiment, after the terminals (that is, the first terminal 20 and the second terminal 30) are crimped to the both ends of the electric wire 10, first, in the first waterproofing step, at the one end of the electric wire 10 to which the non-waterproof first terminal 20 not including the waterproof seal member is crimped, the anticorrosion member 50 is provided to cover the element wire bundle 11 exposed from the insulating sheath 12 so as to isolate the element wire bundle 11 from the outside air. On the other hand, in the second waterproofing step, at the other end of the electric wire 10 to which the waterproof second terminal 30 is crimped, the sealing member 60 is provided to fill the gaps between the conductive element wires 11a in the tubular insulating sheath and seal the inside of tubular insulating sheath 12. Here, by applying and curing the moisture curable resin a plurality of times in the second waterproofing step, it is possible to appropriately provide the sealing member 60 even in the case of the electric wire (thick electric wire) in which a diameter of the element wire bundle 11 is large. In addition, since the gaps between the conductive element wires 11a are sealed at the other end (that is, the electric wire end portion to which the waterproof second terminal 30 is attached) of the electric wire 10, the entering of the water due to the negative pressure caused by the temperature fluctuation described above can be prevented. Even if the sealing of the other end of the electric wire 10 is incomplete, since the one end of the electric wire 10 is covered with the anticorrosion member 50, an amount of water that is absorbed when the negative pressure is generated is limited to a very small amount of water that is originally presented in the tubular insulating sheath 12 of the electric wire 10. Therefore, the manufacturing method according to the present embodiment can manufacture the terminal-equipped electric wire 1 capable of preventing the water from entering into the gaps between the conductive element wires 11a of the electric wire 10.

The order of the first waterproofing step and the second waterproofing step is not particularly limited. However, if the second waterproofing step is performed after the first waterproofing step, even in a case where the sealing member 60 is formed of a material having low viscosity enough to fill (for example, penetrate into) the gaps between the conductive element wires 11a, the sealing member 60 is less likely to enter the inside of the tubular insulating sheath 12 since the entrance and exit of the air is restricted by the anticorrosion member 50 at the one end of the electric wire 10. In other words, the sealing member 60 can be held between the conductive element wires 11a in the vicinity of the other end of the electric wire 10. Accordingly, the impairment of the flexibility of the electric wire 10 due to the sealing member 60 excessively entering the inside of the tubular insulating sheath 12 is prevented.

OTHER EMBODIMENTS

The present invention is not limited to the above embodiment, and various modifications can be adopted within the scope of the present invention. For example, the present invention is not limited to the above-described embodiment, and may be appropriately modified, improved or the like. In addition, materials, shapes, dimensions, numbers, arrangement positions, and the like of the respective constituent elements in the above embodiments are optional and are not limited as long as the present invention can be achieved.

In the above embodiment, when the sealing member 60 is formed, the inside of the tubular insulating sheath 12 at the end portion on the other end side of the electric wire 10 is completely sealed only by the first portion 60A (see FIGS. 7 and 8). On the other hand, in the formation of the sealing member 60, the first portion 60A may be configured to seal a part of an inner portion of the tubular insulating sheath 12 of the end portion on the other end side of the electric wire 10, and the second portion 60B may be configured to seal a remaining portion in the inner portion of the tubular insulating sheath 12 of the end portion on the other end side of the electric wire 10.

Further, in the above embodiment, in the second waterproofing step, the application and the curing of the moisture curable resin are repeated twice. On the other end, in the second waterproofing step, the application and the curing of the moisture curable resin may be repeated three or more times.

Further, in the above embodiment, the anticorrosion member 50 is formed by using the ultraviolet curable resin. On the other hand, the anticorrosion member 50 may be formed using a resin other than the ultraviolet curable resin. Similarly, the sealing member 60 is formed by using the moisture curable resin. On the other hand, the sealing member 60 may be formed by using a resin other than the moisture curable resin.

Further, in the above embodiment, the second waterproofing step is performed after the first waterproofing step. On the other hand, the first waterproofing step may be performed after the second waterproofing step, or the first waterproofing step and the second waterproofing step may be performed at the same time.

Here, features of the embodiment of the method for manufacturing the terminal-equipped electric wire 1 according to the present invention described above will be briefly summarized and listed in [1] and [2] below.

[1] A method for manufacturing a terminal-equipped electric wire (1) having an electric wire (10) including an element wire bundle (11) in which a plurality of conductive element wires (11a) are bundled and a tubular insulating sheath (12) covering the element wire bundle (11), a first terminal (20) crimped to one end of the electric wire (10), and a second terminal (30) crimped to the other end of the electric wire (10), the method including:

a step of crimping the first terminal (20) to the one end of the electric wire (10) so as to electrically connect the element wire bundle (11) exposed from the one end of the electric wire (10) and the first terminal (20);

a step of crimping the second terminal (30) to the other end of the electric wire (10) such that an element wire crimping portion (32) of the second terminal (30) is crimped to the element wire bundle (11) exposed from the other end of the electric wire (10), and a sheath crimping portion (33) of the second terminal (30) is crimped to a tubular seal member (40) attached to an outer periphery of the other end of the electric wire (10);

a first waterproofing step of providing, at the one end of the electric wire (10) to which the first terminal (20) is crimped, an anticorrosion member (50) that covers the element wire bundle (11) so as to isolate the element wire bundle (11) from outside air; and a second waterproofing step of providing, at the other end of the electric wire (10) to which the second terminal (30) is crimped, a sealing member (60) so as to fill gaps between the conductive element wires (11a) the tubular insulating sheath (12) and seal an inside of the tubular insulating sheath, in which the second waterproofing step includes, in this order, a step of applying a moisture curable resin to the element wire bundle (11) which is exposed to an outside and is located between the element wire crimping portion (32) and the sheath crimping portion (33), and causing the moisture curable resin to penetrate gaps between the conductive element wires (11a) so as to block at least a part of an inner portion of the tubular insulating sheath (12), a step of waiting during curing of the moisture curable resin penetrated into the gaps between the conductive element wires (11a) so as to block the at least a part of the inner portion of the tubular insulating sheath (12) or until the curing is completed, and a step of applying the moisture curable resin to the element wire bundle (11) which is exposed to an outside and is located between the element wire crimping portion (32) and the sheath crimping portion (33), and causing the moisture curable resin to penetrate gaps between the conductive element wires (11a) and curing the moisture curable resin so as to block a remaining portion of the inner portion of the tubular insulating sheath (12).

According to the method for manufacturing a terminal-equipped electric wire having a configuration of the above [1], after the terminals (that is, the first terminal and the second terminal) are crimped to the both ends of the electric wire, in the first waterproofing step, at the one end of the electric wire to which the non-waterproof first terminal not including the seal member is crimped, the anticorrosion member is provided to cover the element wire bundle exposed from the insulating sheath so as to isolate the element wire bundle from the outside air. On the other hand, in the second waterproofing step, at the other end of the electric wire to which the waterproof second terminal including the seal member is crimped, the sealing member is provided so as to fill the gaps between the conductive element wires in the tubular insulating sheath and seal the inside of the tubular insulating sheath. Here, by applying and curing the moisture curable resin the plurality of times in the second waterproofing step, it is possible to appropriately provide the sealing member even in the case of the electric wire (thick electric wire) in which the diameter of the element wire bundle is large. In addition, since the gaps between the conductive element wires are sealed at the other end (that is, an electric wire end portion to which the waterproof second terminal is attached) of the electric wire, even if the other end of the electric wire is routed in a place where a temperature fluctuates greatly, such as an engine room, the entering of the water due to the negative pressure described above can be prevented. Even if the sealing of the other end of the electric wire is incomplete, since the one end of the electric wire is covered with the anticorrosion member, the amount of water that is absorbed when the negative pressure is generated is limited to the very small amount of water that is originally presented in the tubular insulating sheath of the electric wire. Therefore, according to the manufacturing method of the present configuration, it is possible to manufacture the terminal-equipped electric wire capable of preventing the water from entering into the gaps between the element wires of the electric wire.

[2] The manufacturing method according to the above [1], in which
  in the first waterproofing step, the anticorrosion member (50) is provided by applying an ultraviolet curable resin so as to cover the element wire bundle (11) and curing the ultraviolet curable resin,
  in the second waterproofing step, the sealing member (60) is provided by applying the moisture curable resin to the element wire bundle (11) which is exposed to the outside and is located between the element wire crimping portion (32) and the sheath crimping portion (33), causing the moisture curable resin to penetrate into the inside of the tubular insulating sheath, and curing the moisture curable resin,
  the ultraviolet curable resin has viscosity of 20 mPa·s or more at room temperature before the curing, and
  the moisture curable resin has viscosity of 5 mPa·s or less at room temperature before the curing.

According to the method for manufacturing a terminal-equipped electric wire having a configuration of the above [2], in which the anticorrosion member is provided at the electric wire end portion to which the first terminal (that is, a non-waterproof terminal) is attached by using the ultraviolet curable resin having appropriately high viscosity. Accordingly, it is possible to form the anticorrosion member that appropriately covers the periphery of the element wire bundle exposed from the insulating sheath while preventing the liquid dripping, the excessive penetration into the element wire bundle, and the like. On the other hand, the sealing member is provided at the electric wire end portion to which the second terminal (that is, a waterproof terminal) is attached by using the moisture curable resin having appropriately low viscosity. Accordingly, the sealing member is formed that allows the resin to rapidly penetrate into the gaps between the conductive element wires to appropriately fill the gaps in the tubular insulating sheath. As described above, the "viscosity" can be measured, for example, in accordance with the viscosity test method defined in JIS K 7233. Further, the "room temperature" is the test temperature determined in this type of viscosity test method, and is, for example, 25° C.

What is claimed is:

1. A method for manufacturing a terminal-equipped electric wire including an electric wire having an element wire bundle in which a plurality of conductive element wires are bundled and a tubular insulating sheath covering the element wire bundle, a first terminal crimped to one end of the electric wire, and a second terminal crimped to the other end of the electric wire, the method comprising:
  a step of crimping the first terminal to the one end of the electric wire so as to electrically connect the element wire bundle exposed from the one end of the electric wire and the first terminal;
  a step of crimping the second terminal to the other end of the electric wire such that an element wire crimping portion of the second terminal is crimped to the element wire bundle exposed from the other end of the electric wire, and a sheath crimping portion of the second terminal is crimped to a tubular seal member attached to an outer periphery of the other end of the electric wire;
  a first waterproofing step of providing, at the one end of the electric wire to which the first terminal is crimped, an anticorrosion member that covers the element wire bundle so as to isolate the element wire bundle from outside air; and
  a second waterproofing step of providing, at the other end of the electric wire to which the second terminal is crimped, a sealing member so as to fill gaps between the conductive element wires in the tubular insulating sheath and seal an inside of the tubular insulating sheath, wherein
  the second waterproofing step includes, in this order,
    a step of applying a moisture curable resin to the element wire bundle which is exposed to an outside and is located between the element wire crimping portion and the sheath crimping portion, and causing the moisture curable resin to penetrate gaps between the conductive element wires so as to block at least a part of an inner portion of the tubular insulating sheath,
    a step of waiting during curing of the moisture curable resin penetrated into the gaps between the conductive element wires so as to block the at least a part of the inner portion of the tubular insulating sheath or until the curing is completed, and
    a step of applying the moisture curable resin to the element wire bundle which is exposed to the outside and is located between the element wire crimping portion and the sheath crimping portion, and causing the moisture curable resin to penetrate the gaps between the conductive element wires and curing the moisture curable resin so as to block a remaining portion of the inner portion of the tubular insulating sheath.

2. The manufacturing method according to claim 1, wherein
  in the first waterproofing step, the anticorrosion member is provided by applying an ultraviolet curable resin so as to cover the element wire bundle and curing the ultraviolet curable resin,
  in the second waterproofing step, the sealing member is provided by applying the moisture curable resin to the element wire bundle which is exposed to the outside and is located between the element wire crimping portion and the sheath crimping portion, causing the moisture curable resin to penetrate into the inside of the tubular insulating sheath, and curing the moisture curable resin, the ultraviolet curable resin has viscosity of 20 mPa·s or more at room temperature before the curing, and the moisture curable resin has viscosity of 5 mPa·s or less at room temperature before the curing.

\* \* \* \* \*